United States Patent
Chang et al.

(10) Patent No.: US 7,061,558 B2
(45) Date of Patent: Jun. 13, 2006

(54) BACKLIGHT MODULE HAVING LIGHT-SHIELDING LAYER UNDER TWO ADJACENT FLUORESCENT LAYERS AND A LIQUID CRYSTAL DISPLAY USING THE SAME

(75) Inventors: Che-Chih Chang, Tai-Chung (TW); Chun-Min Ko, Chang-Hua Hsien (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 10/707,453

(22) Filed: Dec. 15, 2003

(65) Prior Publication Data
US 2004/0119909 A1 Jun. 24, 2004

(30) Foreign Application Priority Data
Dec. 18, 2002 (TW) .................. 91136583 A

(51) Int. Cl.
 G02F 1/1335 (2006.01)
 G09G 3/36 (2006.01)
 H01J 1/62 (2006.01)
(52) U.S. Cl. .................. 349/70; 349/62; 349/63; 349/71; 345/102; 313/484
(58) Field of Classification Search ............ 349/60–65, 349/32, 70, 71, 69; 345/102; 313/582, 583, 313/325, 326, 484, 485; 362/26, 31
See application file for complete search history.

(56) References Cited

U.S. PATENT DOCUMENTS

| | | | |
|---|---|---|---|
| 4,772,885 A * | 9/1988 | Uehara et al. ................ 349/71 |
| 4,780,644 A * | 10/1988 | Sakai et al. ................. 313/582 |
| 5,926,239 A * | 7/1999 | Kumar et al. ................ 349/69 |
| 5,952,782 A * | 9/1999 | Nanto et al. ................ 313/584 |
| 6,420,835 B1 * | 7/2002 | Chen et al. ............. 315/169.4 |
| 6,678,020 B1 * | 1/2004 | Ok et al. ........................ 349/61 |
| 6,683,659 B1 * | 1/2004 | Dirscherl et al. ............. 349/32 |
| 6,707,250 B1 * | 3/2004 | Okano et al. ................ 313/582 |
| 6,857,759 B1 * | 2/2005 | Lee et al. ..................... 362/225 |
| 2003/0122771 A1 * | 7/2003 | Sumiyoshi et al. ......... 345/102 |
| 2004/0051819 A1 * | 3/2004 | Eom ............................ 349/32 |
| 2004/0085021 A1 * | 5/2004 | Hibino et al. ............... 313/582 |

* cited by examiner

Primary Examiner—Tarifur R. Chowdhury
(74) Attorney, Agent, or Firm—Winston Hsu

(57) ABSTRACT

A backlight module comprises an assembly of a rear substrate and a front substrate. A hermetic discharge gap is formed there between and mounted with power electrodes. The backlight module further comprises a discharge gas filled in the discharge gap and a plurality of fluorescent layers of different color emissions disposed on a surface of the assembly of the rear substrate and front substrate. The discharge gas is discharged by the power electrodes.

17 Claims, 7 Drawing Sheets

BACKLIGHT MODULE HAVING LIGHT-SHIELDING LAYER UNDER TWO ADJACENT FLUORESCENT LAYERS AND A LIQUID CRYSTAL DISPLAY USING THE SAME

BACKGROUND OF INVENTION

1. Field of the Invention

The present invention provides a backlight module, and more particularly, relates to a backlight module utilized in a liquid crystal display (LCD) such that high transmittance and sufficient brightness are achieved.

2. Description of the Prior Art

A typical prior art liquid crystal display comprises a transparent electrode pair, a liquid crystal layer disposed between the transparent electrode pair, and two polarizers disposed on a front side and a back side of the liquid crystal display. The liquid crystal display usually comprises a light source for emitting white light. In order to present different colors red color filters, green color filters, and blue color filters, patterned in a mosaic or patterned in a stripe, are formed on a surface of the transparent electrode pair in the prior art liquid crystal display. When liquid crystal molecules in the liquid crystal layer are affected by a potential difference between the transparent electrode pair to align in a specific state, the white light emitted from the light source penetrates the liquid crystal layer and reach each of the color filters. Each of the color filters allows red light, green light, or blue light, all having different wavelengths from each other, to pass to produce color images.

Please refer to FIG. 1, which is a structural schematic diagram of a liquid crystal display 10 according to the prior art. The prior art liquid crystal display 10 comprises a backlight module 12 for emitting white light 13, a first polarizer 14 for screening light having a specific orientation from the white light 13 emitted from the backlight module 12, and a second polarizer 16 for receiving light having the specific orientation screened by the first polarizer 14. A first transparent substrate 18 composed of transparent materials, such as glass and other materials; a first transparent electrode 20 composed of indium tin oxide (ITO); a liquid crystal layer 22; a second transparent electrode 24; an overcoat layer 26 composed of transparent resin; a color filter layer 28 constituted by red color filters 28R, green color filters 28G, and blue color filters 28B; and a second transparent substrate 30 are disposed, from bottom to top, between the first polarizer 14 and the second polarizer 16. The red color filters 28R, the green color filters 28G, and the blue color filters 28B are arranged with regularity and a position of each of the color filters corresponds to a position of each of a plurality of pixel electrodes (not shown) arranged in array on the first transparent electrode 20. A light-impermeable layer 32 is provided between the adjacent color filters.

The prior art liquid crystal display 10 utilizes a cold cathode fluorescent light lamp (CCFL) as a backlight module 12. Invisible light having a wavelength shorter than approximately 400 nm is first produced by the backlight module 12 before being transformed into white light 13. During the transformation, energy loss readily occurs. Moreover, the energy loss problem becomes serious when white light 13 emitted from the backlight module 12 passes through the red color filters 28R, the green color filters 28G, or the blue color filters 28B to respectively display red light 34R, green light 34G, or blue light 34B because only a portion of light having a specific wavelength can pass through each of the red color filters 28R, the green color filters 28G, and the blue color filters 28B. The intensity of red light 34R, green light 34G, and blue light 34B passing through each of the red color filters 28R, the green color filters 28G, and the blue color filters 28B respectively is reduced by over one third of the intensity of the white light 13 emitted from the backlight module 12. Therefore, the prior art liquid crystal display 10 has the problems of low transmittance and insufficient brightness.

SUMMARY OF INVENTION

It is an object of the claimed invention to provide a backlight module utilized in a liquid crystal display to produce color images without utilizing color filters so as to resolve the above-mentioned low transmittance problem and insufficient brightness problem.

According to the claimed invention, the claimed invention backlight module comprises an assembly of a rear substrate and a front substrate, and a hermetic discharge gap is formed there between and mounted with power electrodes. The present invention further comprises a discharge gas filled in the discharge gap, and a plurality of fluorescent layers of different color emissions disposed on a surface of the assembly of the rear substrate and front substrate. The discharge gas is discharged by the power electrodes.

In the claimed invention liquid crystal display, different fluorescent materials are formed in the backlight module. By utilizing the wavelength transforming characteristics of each of the fluorescent materials, the backlight module is able to directly provide red light, green light, and blue light to each of the pixel cells on the liquid crystal panel. As a result, the present invention liquid crystal display does not utilize color filters to produce a color image and thus improves the low transmittance and the insufficient brightness problems, which are frequently seen in the prior art liquid crystal displays and greatly affect these displays.

These and other objectives of the present invention will no doubt become obvious to those of ordinary skill in the art after having read the following detailed description of the preferred embodiment which is illustrated in the various figures and drawings.

DETAILED DESCRIPTION

Figure 1:
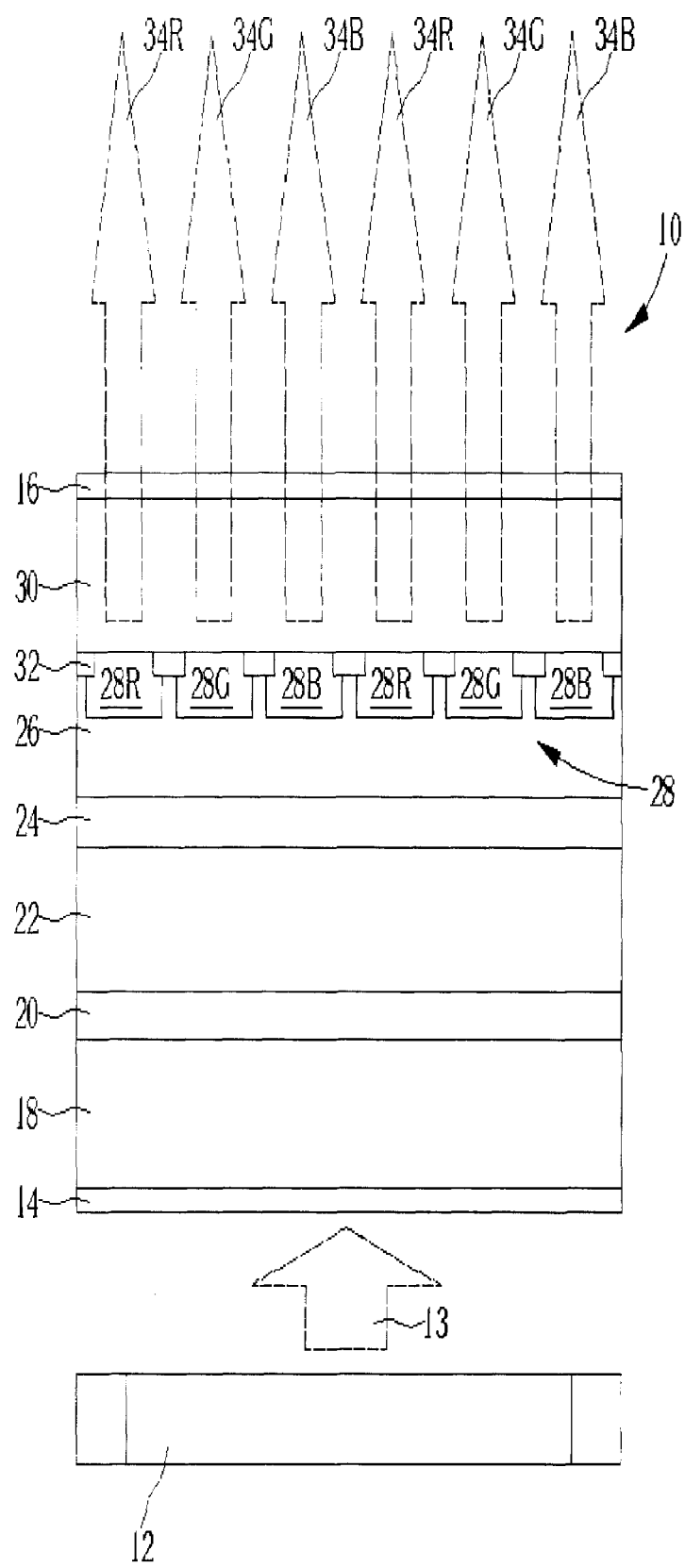
FIG. 1 is a structural schematic diagram of a liquid crystal display according to the prior art.
Figure 2:
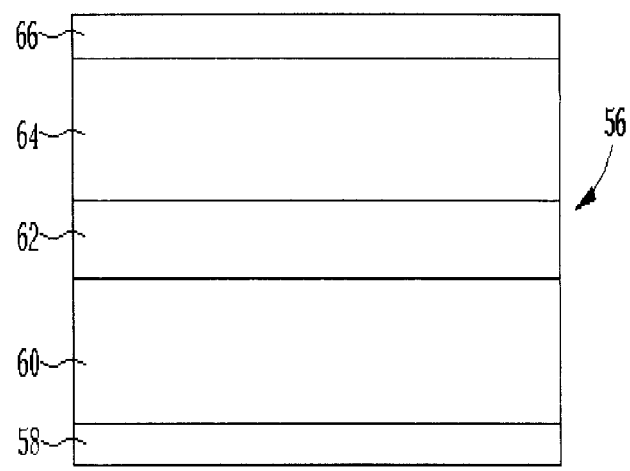
FIG. 2 is a structural schematic diagram of a liquid crystal display according to a first preferred embodiment of the present invention.
Figure 2:
Figure 2:
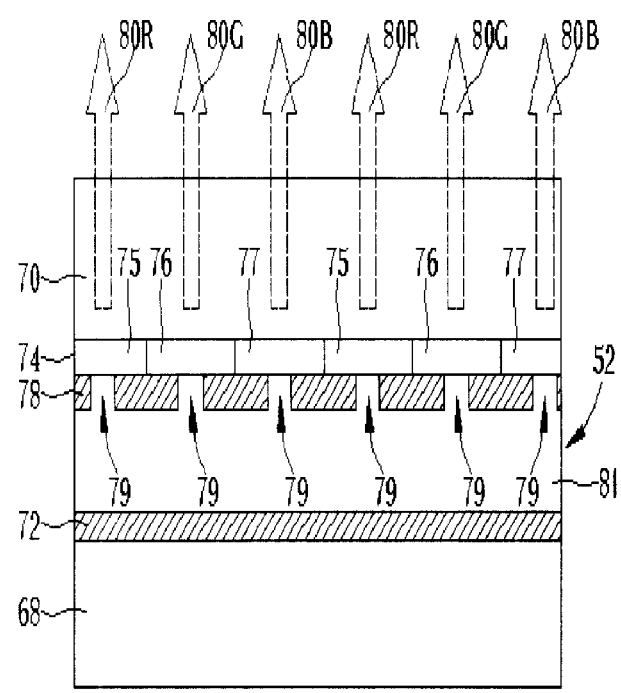

Please refer to FIG. 2. FIG. 2 is a structural schematic diagram of a liquid crystal display 50 according to a first preferred embodiment of the present invention. The present invention liquid crystal display 50 comprises a backlight module 52, a prism layer 54 disposed above the backlight module 52 for converging light emitted from the backlight module 52, and a liquid crystal panel 56 disposed above the prism layer 54. The liquid crystal panel 56 comprises a first polarizer 58, a first glass substrate 60, a liquid crystal layer 62, a second glass substrate 64, and a second polarizer 66. A plurality of pixel cells (not shown) are disposed on the liquid crystal panel 56 and each of the pixel cells (not shown) is driven by a thin film transistor (not shown) formed on a surface of the second glass substrate 64 or on a surface of the first glass substrate 60.

As shown in FIG. 2, the backlight module 52 comprises a rear substrate 68 composed of transparent materials including glass or non-transparent materials; a front substrate 70 composed of transparent materials, such as glass and other materials, disposed parallel with and spaced apart from the rear substrate 68; a first reflective layer 72 composed of reflective materials (e.g. aluminum oxide) disposed on a surface of the rear substrate 68; a fluorescent material layer 74 including at least one first fluorescent material 75, at least one second fluorescent material 76, and at least one third fluorescent material 77 disposed on a surface of the front substrate 70 facing the first reflective layer 72; and a second reflective layer 78 composed of reflective materials (e.g. aluminum oxide) and comprising a plurality of openings 79 disposed on a surface of the fluorescent material layer 74. Actually, the rear substrate 68 and the front substrate 70 may be regarded as an assembly, and a hermitic discharge gap 81 is formed between the rear substrate 68, the front substrate 70, and other elements (not shown). The first fluorescent material 75, the second fluorescent material 76, and the third fluorescent material 77 are used for different color emissions. In addition, power electrodes (not shown) are mounted on both sides of the discharge gap 81 to discharge a discharge gas filled in the discharge gap 81.

A transparent overcoat layer (e.g. a magnesium oxide layer, MgO layer, not shown) is provided between the second reflective layer 78 and the fluorescent material layer 74 to protect the fluorescent material layer 74. A position of each of the openings 79 corresponds to a position of each of the first fluorescent material 75, the second fluorescent material 76, and the third fluorescent material 77 and corresponds to a position of each pixel cell (not shown) on the liquid crystal panel 56.

The backlight module 52 comprises a cold cathode flat fluorescence lamp (CCFFL) or a light emitting diode (LED) for use as a luminous body (not shown). In the first preferred embodiment of the present invention, the cold cathode flat fluorescent lamp is adapted as the luminous body. A plurality of mercury (Hg) atoms filled in the discharge gap 81 between the rear substrate 68 and the front substrate 70 are excited to produce ultraviolet rays having a wavelength of approximately 350 to 375 nm. In addition, an inert gas may be filled in the discharge gap 81 between the rear substrate 68 and the front substrate 70 and be excited to produce ultraviolet rays having a wavelength of approximately 145 nm. In order to achieve the same result, an already developed mercury free lamp, which is filled with an inert gas, may be excited to produce invisible light having a wavelength shorter than approximately 400 nm.

The above-mentioned light emitted from the luminous body enters the fluorescent material layer 74 through each of the openings 79. Due to the different wavelength transforming characteristics of the first fluorescent material 75, the second fluorescent material 76, and the third fluorescent material 77 in the fluorescent material layer 74, each of the first fluorescent material 75, the second fluorescent material 76, and the third fluorescent material 77 transforms the light emitted from the luminous body into red light 80R having a wavelength longer than 600 nm, green light 80G having a wavelength between 500 and 600 nm, and blue light 80B having a wavelength between 400 and 500 nm respectively. Red light 80R, green light 80G, and blue light 80B is provided to each of the corresponding pixel cells (not shown) on the liquid crystal panel 56.

Figure 3:
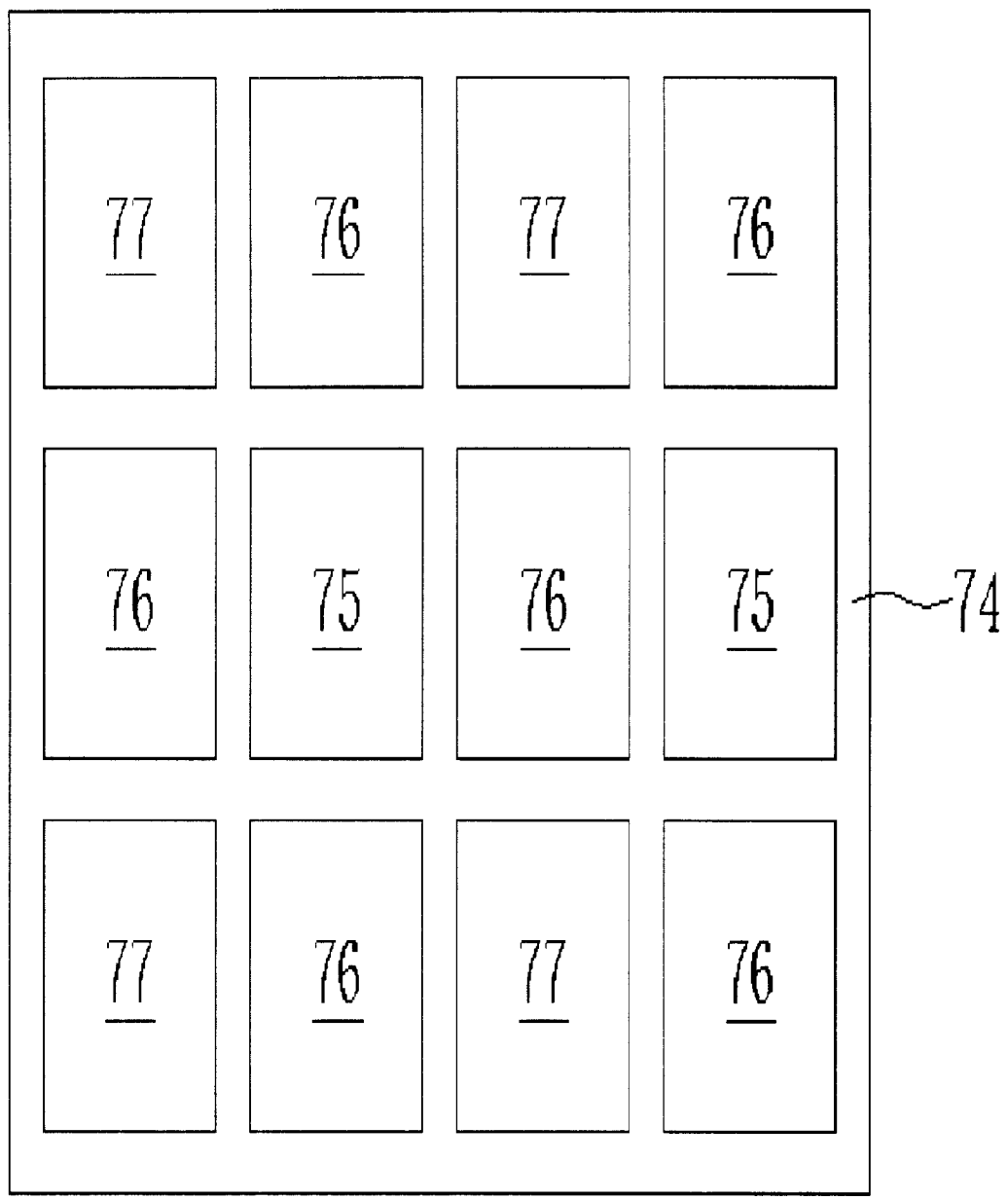
FIG. 3 to FIG. 6 are schematic diagrams of arrangements of fluorescent materials according to the first preferred embodiment of the present invention.
Figure 4:
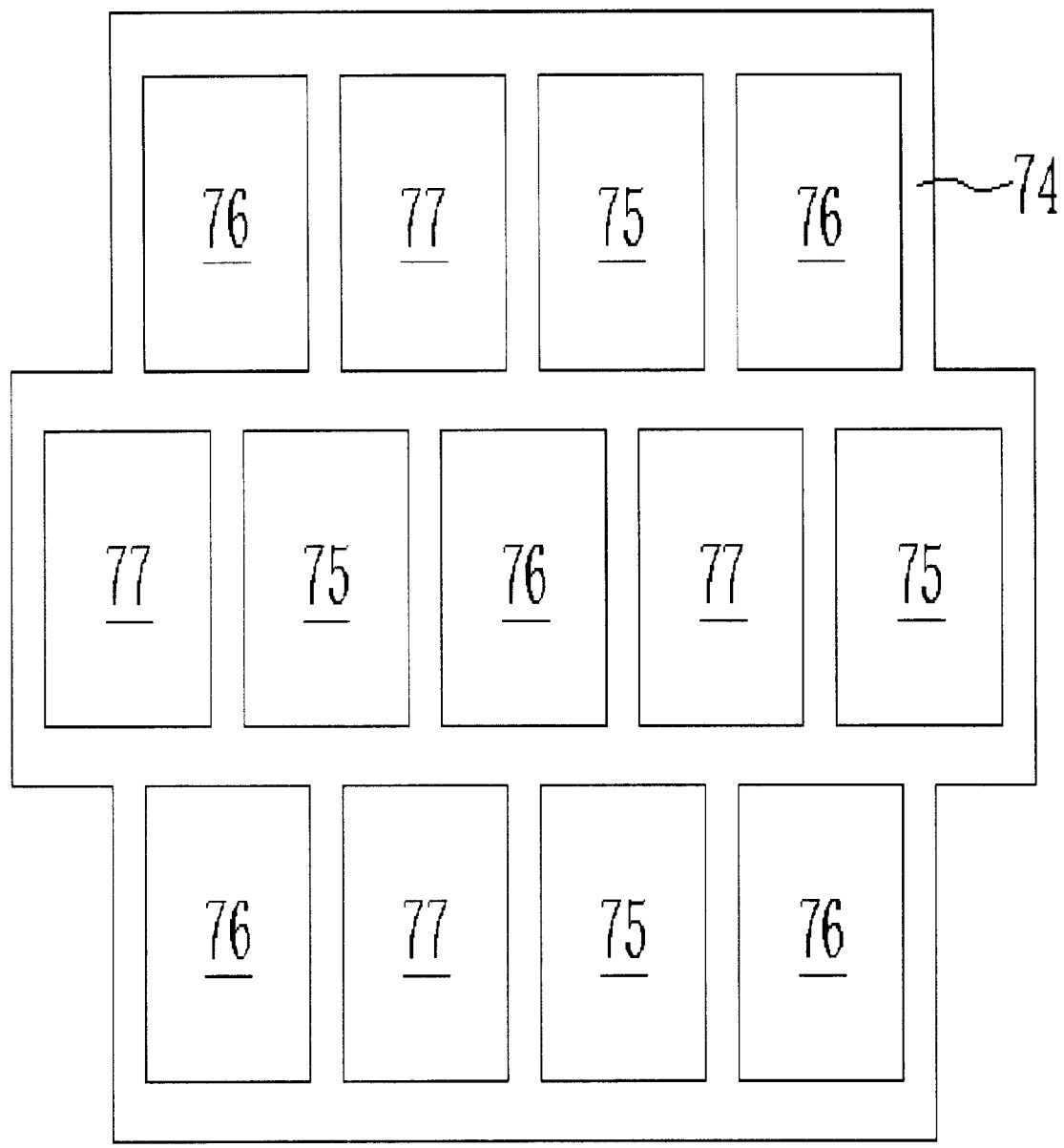
Figure 5:
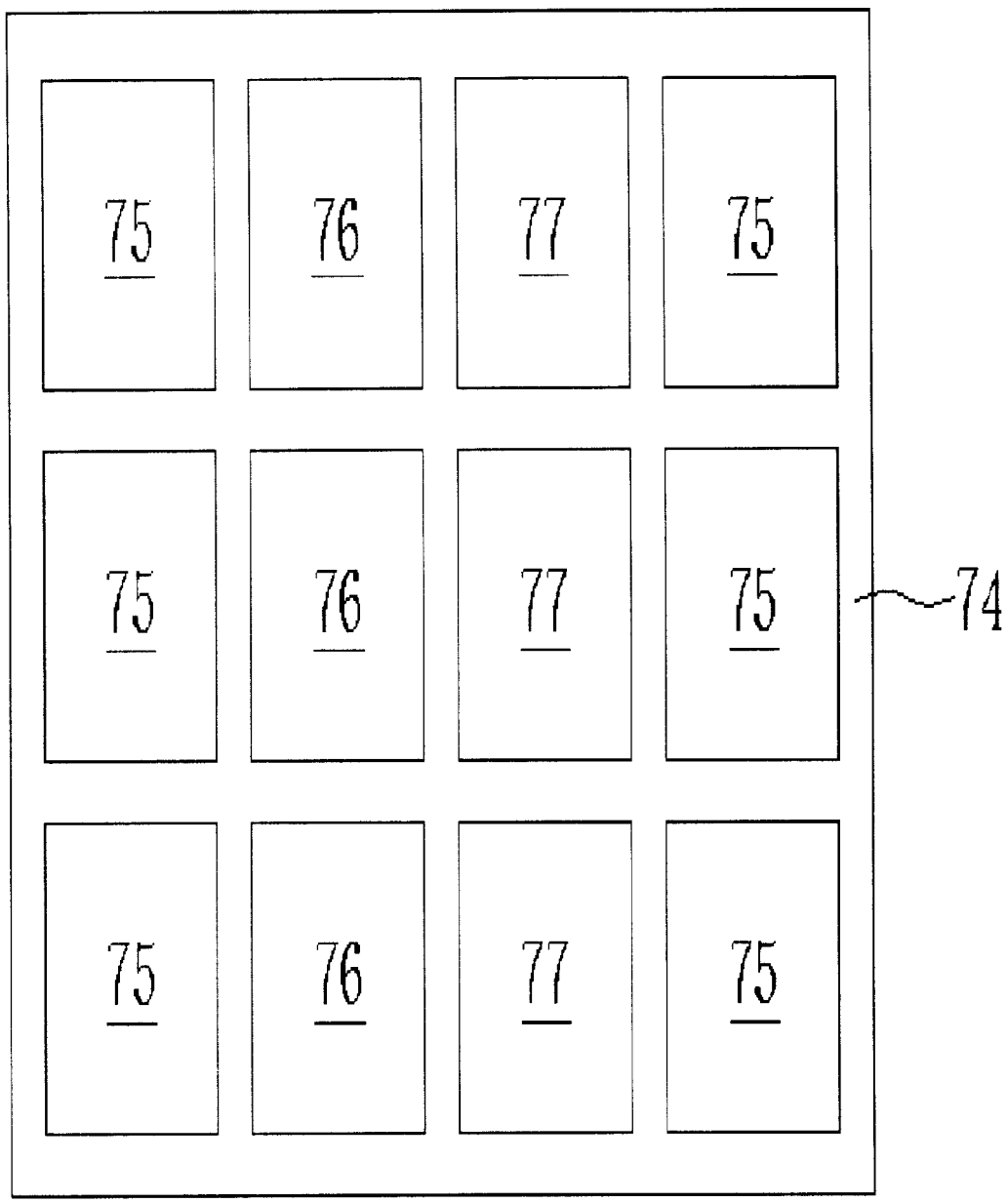
Figure 6:
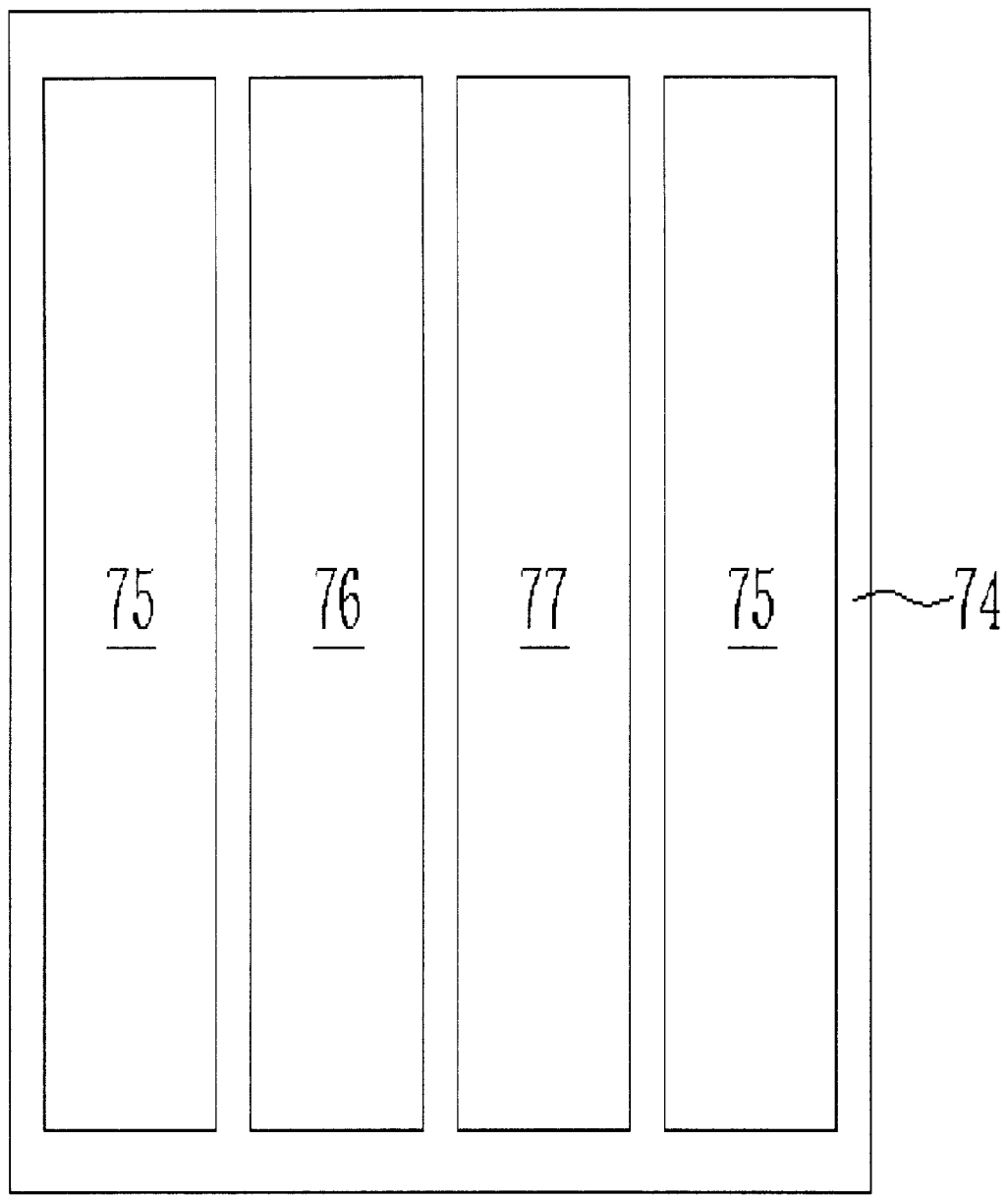

According to a design requirement of the liquid crystal display 50, the first fluorescent material 75, the second fluorescent material 76, and the third fluorescent material 77 in the fluorescent material layer 74 may be patterned in different arrangements. Referring to FIG. 3 to FIG. 6, schematic diagrams of arrangements of fluorescent materials 75,76,77 according to the first preferred embodiment of the present invention are shown. As shown in FIG. 3, the first fluorescent material 75, the second fluorescent material 76, and the third fluorescent material 77 are patterned in a mosaic (mosaic type). As shown in FIG. 4, the first fluorescent material 75, the second fluorescent material 76, and the third fluorescent material 77 are patterned in a triangular arrangement (delta type). As shown in FIG. 5, the first fluorescent material 75, the second fluorescent material 76, and the third fluorescent material 77 are patterned in a first stripe (stripe type 1). As shown in FIG. 6, the first fluorescent material 75, the second fluorescent material 76, and the third fluorescent material 77 are patterned in a second stripe (stripe type 11).

In addition, light may be reflected by the rear substrate 68, rather than by the first reflective layer 72. Therefore, the first reflective layer 72 is not necessarily to be disposed on the rear substrate 68. Furthermore, a plurality of openings (not shown) may be formed in the fluorescent material layer 74. Each of the first fluorescent material 75, the second fluorescent material 76, and the third fluorescent material 77 is parted by the opening (not shown), and a position of each pixel cell (not shown) corresponds to the fluorescent material layer 74 between each opening (not shown). In this case, the second reflective layer 78 is omitted, and a light-shielding layer (not shown), which is also used as a reflective layer, is disposed between each of the two adjacent first fluorescent material 75, second fluorescent material 76, and third fluorescent material 77. Under the circumstances, light is reflected by the light-shielding layer (not shown), rather than by the second reflective layer 78. At the same time, the light-shielding layer (not shown) will effectively divide light of different colors emitted from the first fluorescent material 75, the second fluorescent material 76, and the third fluorescent material 77 to prevent the cross talk phenomenon. However, when the light-shielding layer (not shown) is a black matrix, the occurrence of cross talk is prevented but light cannot be reflected by the light-shielding layer (not shown).

The same design may be applied to the rear substrate 68. That means, another fluorescent material layer (not shown) including a plurality of openings (not shown) corresponding to the openings (not shown) in the fluorescent material layer 74 may be disposed on the surface of the rear substrate 68. Each first fluorescent material (not shown), each second fluorescent material (not shown), and each third fluorescent material (not shown) in this fluorescent material layer (not shown) is parted by the opening (not shown), and a position of each pixel cell (not shown) corresponds to the fluorescent material layer 74 between each opening (not shown) in the fluorescent material layer 74. Similarly, the first reflective layer 72 is omitted and light is reflected by many other light-shielding layers (not shown), rather than by the first reflective layer 72. Or these other light-shielding layers are only used for preventing the cross talk phenomenon.

Figure 7:
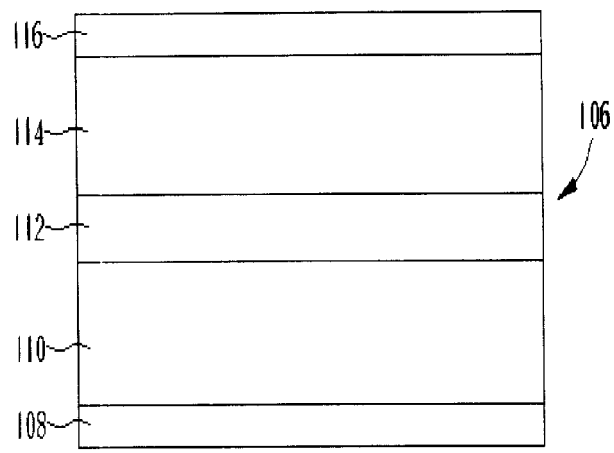
FIG. 7 is a structural schematic diagram of a liquid crystal display according to a second preferred embodiment of the present invention.
Figure 7:
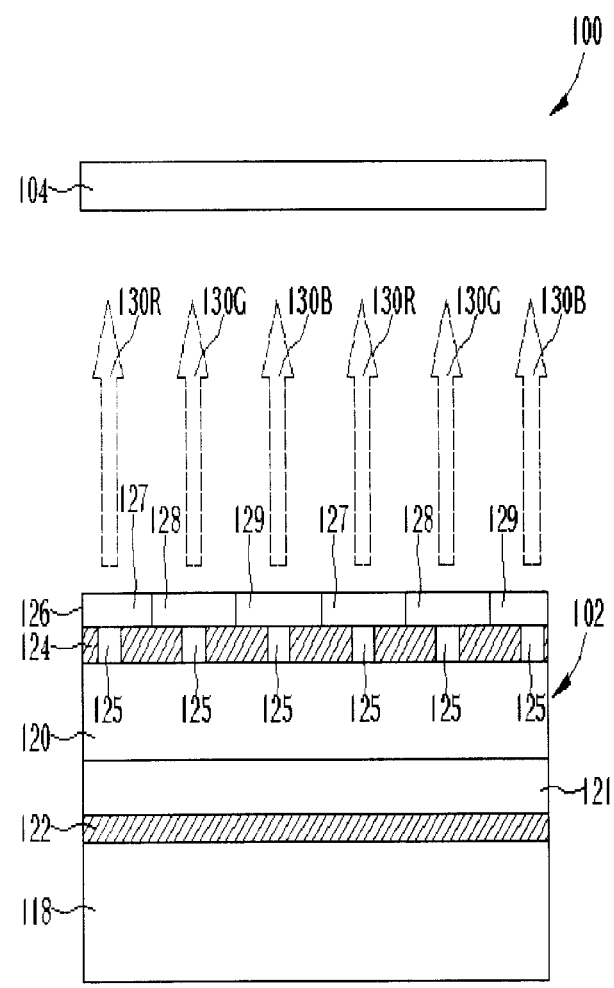

Please refer to FIG. 7. FIG. 7 is a structural schematic diagram of a liquid crystal display 100 according to a second preferred embodiment of the present invention. The present invention liquid crystal display 100 comprises a backlight module 102, a prism layer 104 disposed above the backlight module 102 for converging light emitted from the backlight module 102, and a liquid crystal panel 106 disposed above the prism layer 104. The liquid crystal panel 106 comprises a first polarizer 108, a first glass substrate 110, a liquid crystal layer 112, a second glass substrate 114, and a second polarizer 116. A plurality of pixel cells (not shown) are disposed on the liquid crystal panel 106 and each of the pixel cells (not shown) is driven by a thin film transistor (not shown) formed on a surface of the second glass substrate 114 or on a surface of the first substrate glass substrate 110.

As shown in FIG. 7, the backlight module 102 comprises a rear substrate 118 composed of transparent materials or non-transparent materials; a front substrate 120 composed of transparent materials disposed parallel with and spaced apart from the rear substrate 118; a first reflective layer 122 composed of aluminum oxide disposed on a surface of the rear substrate 118; a second reflective layer 124 composed of aluminum oxide and comprising a plurality of openings 125 disposed on a surface of the front substrate 120; and a fluorescent material layer 126 including at least one first fluorescent material 127, at least one second fluorescent material 128, and at least one third fluorescent material 129 disposed on a surface of the second reflective layer 124.

A magnesium oxide layer (MgO layer, not shown) is provided between the second reflective layer 124 and the fluorescent material layer 126 to protect the fluorescent material layer 126. A position of each of the openings 125 corresponds to a position of each of the first fluorescent material 127, the second fluorescent material 128, and the third fluorescent material 129 and corresponds to a position of each pixel cell (not shown) on the liquid crystal panel 106. Actually, the rear substrate 118 and the front substrate 120 may be regarded as an assembly, and a hermitic discharge gap 121 is formed between the rear substrate 118, the front substrate 120, and other elements (not shown). The first fluorescent material 127, the second fluorescent material 128, and the third fluorescent material 129 are used for different color emissions. In addition, power electrodes (not shown) are mounted on both sides of the discharge gap 121 to discharge a discharge gas filled in the discharge gap 121.

Similar to the first preferred embodiment, the backlight module 102 comprises a cold cathode flat fluorescence lamp (CCFFL) as a luminous body. The first fluorescent material 127, the second fluorescent material 128, and the third fluorescent material 129, patterned in different arrangements, transform the light emitted from the luminous body into red light 130R, green light 130G, and blue light 130B respectively. According to the second preferred embodiment of the present invention, the fluorescent material layer 126 in the backlight module 102 is formed on a surface of the front substrate 120 facing the prism layer 104. Therefore, the divergent angles of red light 130R, green light 130G, and blue light 130B, produced by the first fluorescent material 127, the second fluorescent material 128, and the third fluorescent material 129 respectively are smaller, resulting in better convergence. The cross talk phenomenon is thus avoided when red light 130R, green light 130G, and blue light 130B is provided to each of the corresponding pixel cells (not shown) on the liquid crystal panel 106.

It is worth noticing that if the cold cathode flat fluorescence lamp is adapted as the luminous body of the backlight module 102 in the second preferred embodiment of the present invention, the front substrate 120 should be composed of transparent materials permeable to ultraviolet rays, such as quartz or another material. In addition, light may be reflected by the rear substrate 118, rather than by the first reflective layer 122. Therefore, the first reflective layer 122 is not necessarily to be disposed on the rear substrate 118.

The present invention liquid crystal display comprises a backlight module, a prism layer, and a liquid crystal panel having a plurality of pixel cells. A fluorescent material layer is formed on a surface of the front substrate in the backlight module (and the fluorescent material layer may be formed on a surface of the rear substrate). The fluorescent material layer compriese a first fluorescent material, a second fluorescent material, and a third fluorescent material to transfer the light emitted from the luminous body in the backlight module into red light, green light, and blue light respectively. Red light, green light, and blue light are provided to each of the corresponding pixel cells on the liquid crystal panel.

Compared to the prior art liquid crystal display, the present invention liquid crystal display is characterized in forming different fluorescent materials in the backlight module. By utilizing the wavelength transforming characteristics of each of the fluorescent materials, the backlight module is able to directly provide red light, green light, and blue light to each of the pixel cells on the liquid crystal panel. Therefore, the present invention liquid crystal display does not require color filters to produce a color image, and thus solves the low transmittance problem and the insufficient brightness problem which are frequently seen in the prior art liquid crystal display.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A backlight module comprising:
   an assembly of a rear substrate and a front substrate, a hermetic discharge gap being formed there between and mounted with power electrodes;
   a discharge gas filled in the discharge gap, the discharge gas being discharged by the power electrodes;
   a plurality of fluorescent layers of different color emissions disposed on a surface of the assembly of the rear substrate and front substrate;
   a light-shielding layer disposed under the two adjacent fluorescent layers of different color emissions; and
   an opening disposed under each fluorescent layer.

2. The backlight module of claim 1, wherein the fluorescent layers of different color emissions are disposed on an inner surface of the assembly of the rear substrate and the front substrate inside the discharge gap.

3. The backlight module of claim 1, wherein the fluorescent layers of different color emissions are disposed on an outer surface of the front substrate outside the discharge gap.

4. The backlight module of claim 1, wherein the light-shielding layer is a first reflective layer.

5. The backlight module of claim 4, further comprising a second reflective layer disposed on an inner surface of the assembly of the rear substrate and the front substrate inside the discharge gap.

6. The backlight module of claim 1, wherein the light-shielding layer is a black matrix.

7. The backlight module of claim 1, wherein the fluorescent layers of different color emissions are arranged in a delta shape, in a mosaic shape, in a first strip shape, or in a second strip shape.

8. The backlight module of claim 1, wherein the rear substrate and the front substrate are made of a glass material.

9. A liquid crystal display comprising:
- a liquid crystal panel, the liquid crystal panel comprising:
  - a first substrate;
  - a second substrate parallel with and spaced apart from the first substrate; and
  - a liquid crystal layer disposed between the first substrate and the second substrate;
- a backlight module, operable to illuminate the liquid crystal panel for displaying color images, and the backlight module including a plurality of fluorescent layers configured to emit light of different colors to the liquid crystal panel;
- a light-shielding layer disposed under the two adjacent fluorescent layers of different color emissions; and
- an opening disposed under each fluorescent layer.

10. The liquid crystal display of claim 9, wherein the backlight module further comprising:
- an assembly of a third substrate and a fourth substrate above the third substrate, a hermetic discharge gap being formed there between and mounted with power electrodes;
- a discharge gas filled in the discharge gap, and the discharge gas being discharged by the power electrodes; and
- a plurality of fluorescent layers of different color emissions being disposed on a surface of the assembly of the third substrate and the fourth substrate.

11. The liquid crystal display of claim 10, wherein the fluorescent layers of different color emissions are disposed on an inner surface of the assembly of the third substrate and the fourth substrate inside the discharge gap.

12. The liquid crystal display of claim 10, wherein the fluorescent layers of different color emissions are disposed on an outer surface of the fourth substrate outside the discharge gap.

13. The liquid crystal display of claim 10, wherein the fluorescent layers of different color emissions are arranged in a delta shape, in a mosaic shape, in a first strip shape, or in a second strip shape.

14. The liquid crystal display of claim 10, wherein the fourth substrates is permeable to ultraviolet rays.

15. The liquid crystal display of claim 9, wherein the light-shielding layer is a first reflective layer.

16. The liquid crystal display of claim 15, further comprising a second reflective layer disposed on an inner surface of the assembly of the third substrate and the fourth substrate inside the discharge gap.

17. The liquid crystal display of claim 9, wherein the light-shielding layer is a black matrix.

* * * * *

UNITED STATES PATENT AND TRADEMARK OFFICE
CERTIFICATE OF CORRECTION

PATENT NO. : 7,061,558 B2
APPLICATION NO. : 10/707453
DATED : June 13, 2006
INVENTOR(S) : Chang et al.

It is certified that error appears in the above-identified patent and that said Letters Patent is hereby corrected as shown below:

On the title page item (54) and col. 1, line 1, change "backlight module having light-shielding layer under two adjacent fluorescent layers and a liquid crystal display using the same" to --BACKLIGHT MODULE AND A LIQUID CRYSTAL DISPLAY USING THE SAME--.

Signed and Sealed this

Tenth Day of October, 2006

JON W. DUDAS
*Director of the United States Patent and Trademark Office*